United States Patent [19]

Saitoh et al.

[11] Patent Number: 4,734,708

[45] Date of Patent: * Mar. 29, 1988

[54] MAGNETIC RECORDING MEDIUM AND MAGNETIC RECORDING METHOD

[75] Inventors: Koichi Saitoh; Teruhiko Itami; Toshifumi Kimoto; Kiyoshi Horie, all of Kanagawa, Japan

[73] Assignee: Fuji Xerox Co., Ltd., Tokyo, Japan

[*] Notice: The portion of the term of this patent subsequent to Mar. 12, 2002 has been disclaimed.

[21] Appl. No.: 535,116

[22] Filed: Sep. 23, 1983

Related U.S. Application Data

[63] Continuation-in-part of Ser. No. 411,187, Aug. 25, 1982, Pat. No. 4,503,438.

[30] Foreign Application Priority Data

Aug. 28, 1981 [JP] Japan ................. 56-134262

[51] Int. Cl.$^4$ ............................................ G01D 15/12
[52] U.S. Cl. .................... 346/74.4; 346/74.2
[58] Field of Search ................. 360/59; 346/74.2, 74.4

[56] References Cited

U.S. PATENT DOCUMENTS

| | | | |
|---|---|---|---|
| 4,032,923 | 6/1977 | Pond et al. | 346/74.4 |
| 4,442,441 | 4/1984 | Kikuchi et al. | 346/74.4 |
| 4,480,250 | 10/1984 | Nishimura et al. | 346/74.4 |
| 4,503,438 | 3/1985 | Saitoh et al. | 346/74.4 |

Primary Examiner—Arthur G. Evans
Attorney, Agent, or Firm—Sughrue, Mion, Zinn, Macpeak, and Seas

[57] ABSTRACT

In a magnetically recording and erasing the magnetic latent image on the magnetic recording medium, the magnetic recording medium includes a base layer, a first magnetic layer in which a repetitive magnetic pattern is in advance formed, and a second magnetic layer on which the magnetic latent image to be formed is thermo-magnetically formed. A method of erasing the magnetic latent image on the second magnetic layer includes the steps of simultaneously applying an external magnetic field and heat to be thermally magnetized layer of a magnetic recording medium.

5 Claims, 24 Drawing Figures

MAGNETIC RECORDING MEDIUM AND MAGNETIC RECORDING METHOD

This application is a continuation in part of Ser. No. 411,187, filed 8-25-82 now U.S. Pat. No. 4,503,438.

BACKGROUND OF THE INVENTION

This invention relates to a magnetic recording medium and a magnetic recording method, more particularly to a thermo-magnetic recording medium and method by which a thermal pattern as input signals is appropriately converted into a magnetic signal pattern. Further, this invention relates to a demagnetizing method for a thermo-magnetic recording operation.

In magnetic recording methods, a magnetic latent image is formed in a magnetic material by magnetization and is then made visible by magnetic toner particles, namely, magnetization detection type coloring particles which include magnetic particles in macromolecular resin, for instance, and which are affected by a magnetic field. The visible image thus obtained is transferred onto a sheet or the like by an electrostatic or magnetic method, and is then fixed by heat or pressure.

The same process is again carried out when the magnetic latent image carrier, namely, the magnetic recording medium, after being subjected to magnetic toner removal, is directly moved to the next developing cycle, or when, with the magnetic latent image erased, a new latent image has been formed.

In the above-described magnetic recording method, the magnetic latent image is, in general, formed by magnetization with a recording current being allowed to flow in the magnetic head adjacent to the magnetic recording medium according to the image signals.

In the case where such a magnetic head is used to form a magnetic latent image over the entire width of the magnetic recording medium, in general, single or plural printing sections for magnetization, i.e., magnetic recording tracks with recording gaps are provided, and a magnetic recording operation is carried out by the combination of a recording operation (main scanning) in the direction of movement of the magnetic recording medium and a transverse scanning operation (auxiliary scanning) performed perpendicularly to the aforementioned direction.

According to this method, an accurate drive and control method for maintaining the auxiliary scanning intervals constant is required, or it is necessary to move the magnetic recording medium at a high speed to reduce the scanning time, or to move the magnetic recording medium at low speed to form an image through development and transfer. That is, a precise and expensive drive and control method including various operational modes is required.

For such a scanning magnetic head recording operation, a method has been proposed in which a so-called multi-magnetic head array, in which magnetic recording tracks are provided over the entire image width with high density so as to meet the necessary resolution of the reproduced image, is used to record the image one picture element by one picture element as the magnetic recording medium is moved.

With this multi-magnetic head array, in order to attain sufficient resultion of the reproduced image, it is necessary to provide thin tracks (less than about 100 μm in width) at intervals of about 100 μm.

Furthermore, in order to reduce the recording current, it is necessary to provide coils of plural turns for these tracks; that is, small and intricate parts are necessary. In addition, because of the electromagnetic interference between adjacent tracks, the realization of such a multi-magnetic-head array is considerably difficult.

In erasing the magnetic latent image, it has been proposed to apply AC magnetic field to the magnetic recording medium provided with the magnetic latent image.

In this case, one may consider utilizing an erasing magnetic head to erase the magnetic latent image on the magnetic recording medium. In general, the erasing magnetic head is energized by a high frequency power source and has a long track width.

Further, in the above-described AC magnetic field application method in which a magnetic head having a long track width is used, the head must be considerably high in uniformity in the longitudinal direction in order that it may be brought in satisfactorily close contact with the recording medium, with a result that the head becomes high in manufacturing cost.

SUMMARY OF THE INVENTION

A variety of methods of forming magnetic latent images have been proposed for the above-described magnetic recording method. Among these methods, the so-called thermomagnetic recording method in which a magnetic latent image is formed according to a thermal input is excellent in that an inexpensive heating array can be used to form the latent image.

Accordingly, an object of this invention is to provide a magnetic recording medium which can be easily operated at a high-speed in comparison with the conventional magnetic recording method using the magnetic head.

Another object of the invention is to provide a simple magnetic recording method with a high-speed performance using the above magnetic recording medium.

Another object of the invention is to provide an alternative thermo-magnetic erasing method avoiding the above AC erasing method using the long magnetic head.

The foregoing objects of the invention have been achieved by using a thermal pattern in accordance with a reproduced image or image signals in a formation of the latent magnetic pattern.

Further, it has been achieved by the provision of a method of erasing a magnetic latent image in which, according to the invention, a magnetic latent image formed on a magnetic recording medium is erased by simultaneously applying both heat and a magnetic field.

BRIEF DESCRIPTION OF THE DRAWINGS

FIGS. 11(a) and 11(b) are diagrams for showing magnetic patterns of the magnetic field source.

DETAILED DESCRIPTION OF THE PREFERRED EMBODIMENTS

The present invention will be described in detail with reference to the accompanying drawings.

FIG. 9 is an explanatory diagram for describing a thermo-magnetic recording medium which is employed in the thermo-magnetic recording method.

Figure 9A:
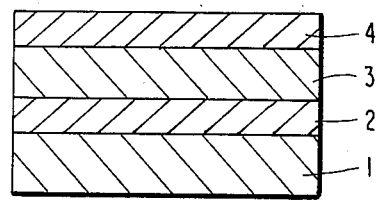
FIGS. 9(a), 9(b), 9(c) 9(d) are diagrams for describing constructions of the thermo-magnetic recording mediums.

The recording medium, as shown in FIG. 9(a), is made up of a non-magnetic base layer 1, a first magnetic layer 2 which is magnetized in advance, a non-magnetic intermediate layer 3, and a second magnetic layer 4.

Figure 9B:
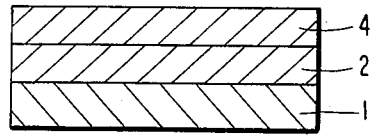
Figure 9C:
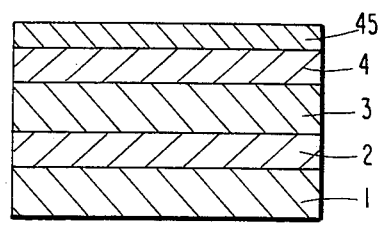
Figure 9D:
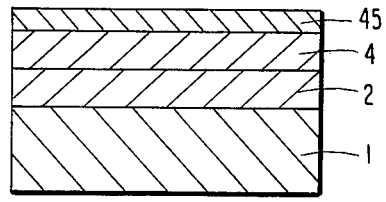

The non-magnetic intermediate layer 3 may be eliminated as shown in FIG. 9(b). A protective layer 45 as shown in FIG. 9(c) may be formed on the surface of the second magnetic layer 4. Of course, as shown in FIG. 9(d), the protective layer 45 may be formed on the surface of the second magnetic layer 4 indicated in FIG. 9(b).

Hereinafter, the formation process of the magnetic latent image on the magnetic recording medium as shown in FIG. 1 will be described in detail with reference to the accompanying drawings.

FIGS. 1 (a) through 1(c) are explanatory diagrams for describing the thermo-magnetic recording method using the thermo-magnetic recording medium corresponding to the construction of FIG. 9(a).

Figure 1A:
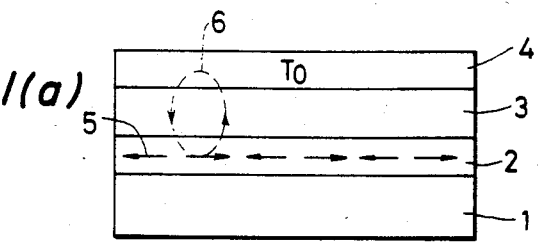
FIGS. 1(a), 1(b), 1(c) are diagrams for describing the principles of forming a magnetic latent image.

FIG. 1(a) shows the magnetization state of the recording medium before the input of the thermal pattern. That is, a repetitive magnetization pattern as indicated at 5 is provided over the entire first magnetic layer 2.

In this case, it can be considered that the magnetic flux 6 which is produced from the magnetization pattern 5 is distributed in the intermediate layer 3 and the second magnetic layer 4. However, the magnetic field H due to the magnetic flux 6 which acts on the second magnetic layer is selected so as to be smaller than the coercive field Hc ($T_0$) at a temperature $T_0$ which is, for instance, the temperature of the environmental atmosphere when no thermal pattern is applied to the second magnetic layer.

Accordingly, in the case of FIG. 1(a), the magnetic recording medium contains no image data.

A thermal pattern is then formed on the second magnetic layer 4 of the magnetic recording medium by selectively exposing the latter to light, by allowing the same to contact a thermal head, or by applying a laser beam spot to the same. In this case, in the medium, the high temperature state is represented by a temperature $T_2$, and the low temperature state is represented by a temperature $T_1$, such that, for instance ($T_0 \leq T_1 \leq T_2$).

Figure 2A:
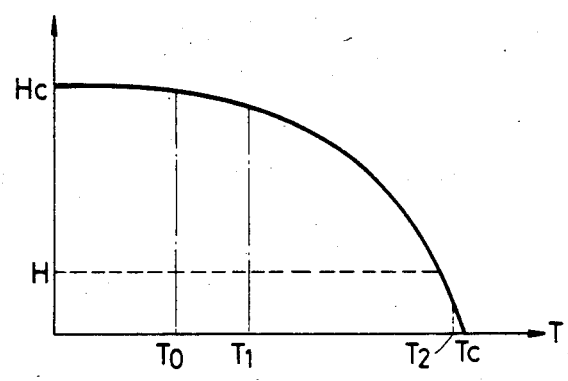
FIGS. 2(a) and 2(b) are diagrams indicating the thermo-magnetic effect in a second magnetic layer.

If, in this case, the second magnetic layer is made of a material whose coercive field Hc changes with temperature as indicated in FIG. 2(a), only the high temperature portion $T_2$ is selectively subjected to residual magnetization.

FIG. 2(a) is a graphical representation indicating the temperature dependence of the coercive field Hc, which is one of the thermo-magnetic effects. In FIG. 2(a), reference Tc designates the Curie temperature.

Figure 2B:
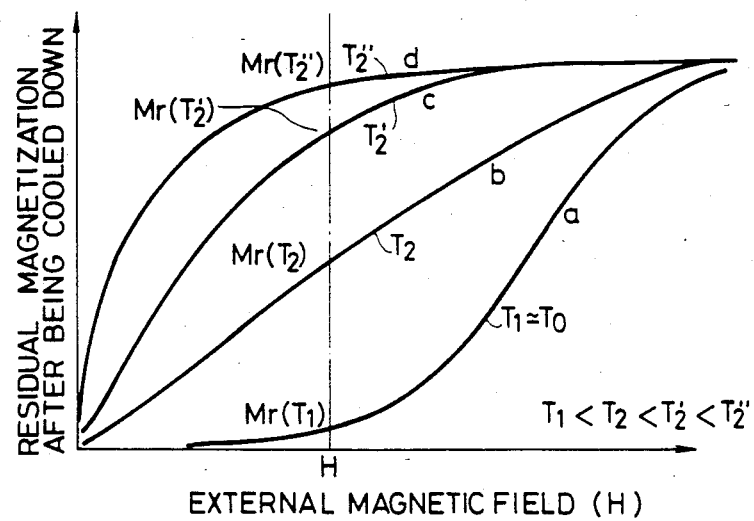

The thermal residual magnetization phenomenon in the invention can be described clearly with reference to FIG. 2(b). Thermal residual magnetization is a phenomenon in which, when a magnetic material is cooled down to room temperature ($=T_0 \approx T_1$) after being heated to an initial temperature $T_2$ under the application of an external magnetic field H (the horizontal axis of FIG. 2(b)), the magnetic material has a thermal residual magnetization of Mr ($T_2$).

Figure 1B:
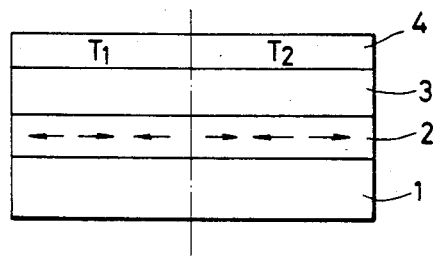
Figure 1C:
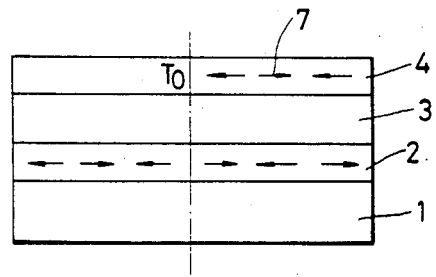

Accordingly, the process from FIGS. 1(b) to 1(c) can be described with reference to FIG. 2(b) as follows.

The magnetic field H (as indicated in FIG. 2(b)) produced by the first magnetic layer acts on the second magnetic layer 4. As the high temperature portion $T_2$ only is cooled to $T_0$ from high temperature $T'_2$ or $T''_2$, it exhibits thermal residual magnetization of Mr($T_2$), Mr($T'_2$) or Mr($T''_2$), while the low temperature portion $T_1$ scarcely exhibits residual magnetization.

Through the above-described operation, a magnetic latent image is formed in correspondence to the thermal pattern without applying a magnetic field from an external source.

Hereinafter, a method of manufacturing a thermo-magnetic recording medium as shown in FIG. 9 will be described in detail.

A first magnetic layer in which a magnetic pattern is uniformly formed in advance, is coated or applied on an entire surface of the base layer. Separately, a thin second magnetic layer which a protective layer and non-magnetic material layer may be respectively formed on the opposite surfaces of the second magnetic layer if necessary is prepared. Subsequently, a thermo-magnetic recording medium of the present invention is obtained by applying the thin second magnetic layer on the first magnetic layer.

The second magnetic layer is made of a magnetic material which exhibits the above-described thermal residual magnetization phenomenon. In this connection, it is preferable to select a magnetic material whose thermal residual magnetization occurs in a high temperature range which is relatively close to room temperature. It is more preferable to use as the second magnetic layer a dispersion coat type $CrO_2$ (chromium dioxide) magnetic layer whose Curie temperature is about 130° C., or a non-crystalline thin film of a rare earth metal-transition metal alloy (Tb-Fe, or Gd-Fe).

Though a thickness of the recording layer (the second magnetic layer) may vary in response to a spatial magnitude of the formed magnetization in advance on the first magnetic layer and a size of the magnetization detection type image visualizing particles, according to investigations made by the present inventors, the following facts have been found.

Assuming that an average grain size of the image visualizing particles is "d", the thickness of the recording layer may be in a range from d/100 to 10 d, or preferably in a range from d/10 to 5 d. If the thickness of the recording layer is less than d/100, the developing can not be sufficiently performed. On the other hand, if the thickness is more than 10 d, the recording magnetization level of the magnetic latent image is low and the image density is decreased. Similarly to the former, the developing cannot be sufficiently performed.

Specifically, as an average grain size d of the image visualizing particles, it has been found that the most preferable is $1\ \mu m < d < 100\ \mu m$.

As described above, the first magnetic layer of the present invention is employed as a magnetic field source acting on the input of the thermal pattern applied on the second magnetic layer. However, the first magnetic layer of the present invention is always closely disposed on the second magnetic layer of a thermo-magnetic recording layer, differently from the conventional external magnetic field source in the thermal residual magnetization. On the other hand, according to the investigations made by the present inventors, it has been found that a magnetic field magnitude of the first magnetic layer is sufficiently employed as an external magnetic field source when input of the thermal pattern, but a magnetic pattern of the first magnetic layer is not sufficiently employed as a magnetic source to attract magnetization detection type image visualizing particles thereon.

It has been clearly found that such an affecting degree to the magnetization detection type image visualizing particles can be controlled by the construction of the magnetic recording medium. That is, as shown in FIG. 9, because the first magnetic layer is located on the base layer and is located away from a developing apparatus in comparison with the second magnetic layer, a magnetic field generated from the entire uniform magnetic pattern of the first magnetic layer is not sufficient to attract the magnetization detection type image visualizing particles.

However, to one's surprise, the magnetic field of the first magnetic layer is sufficiently employed in magnitude as a magnetic field application for the thermal residual magnetization phenomenon, but it is not sufficient to attract the particles.

Such characteristics may be caused by the fact that, because a magnetic flux generated from the first magnetic layer forms closed loops in the second magnetic layer and the magnetic field abruptly decreases away from the first magnetic layer, the magnetic flux is decreased as to a degree that it cannot attract the image visualizing particles in a developing region but the magnetic field from the first magnetic layer is sufficiently employed as an external magnetic field source for the second magnetic layer.

Such a selectively magnetic field action can be preferably controlled by selecting the thickness of the second magnetic layer and the uniform magnetic pattern formed over the first magnetic layer.

Figure 10A:
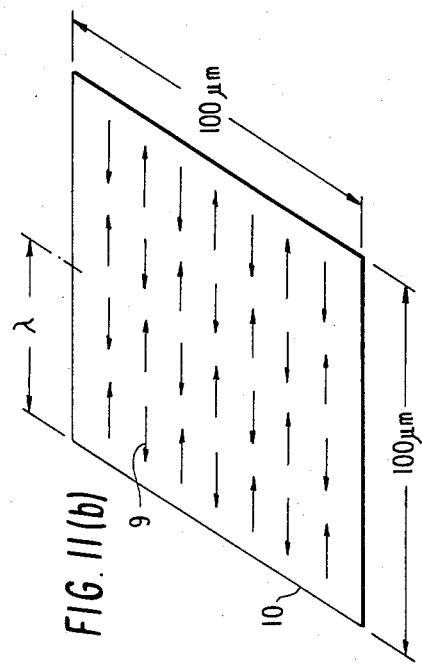
FIGS. 10(a) and 10(b) are diagrams for describing the magnetic field effect with respect to a distance from the magnetic field source.
Figure 10A:
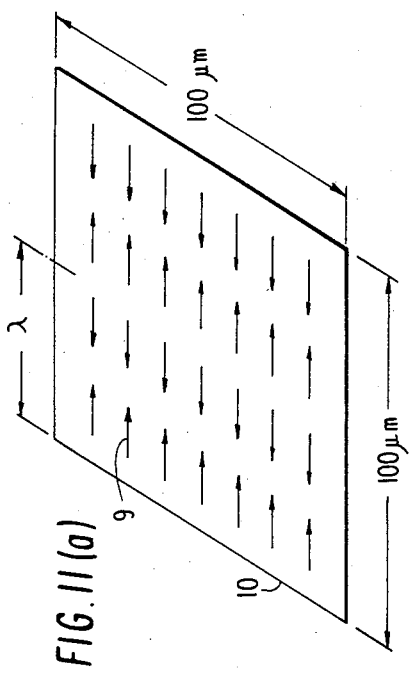
Figure 10A:
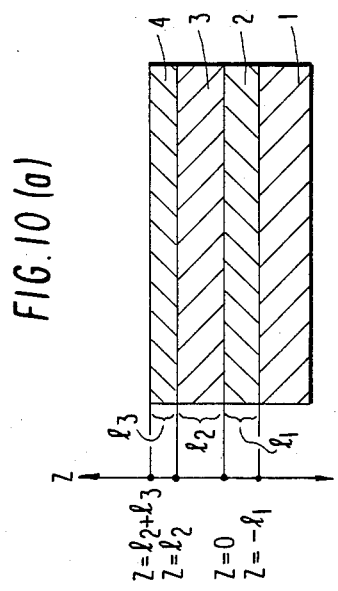
Figure 10B:
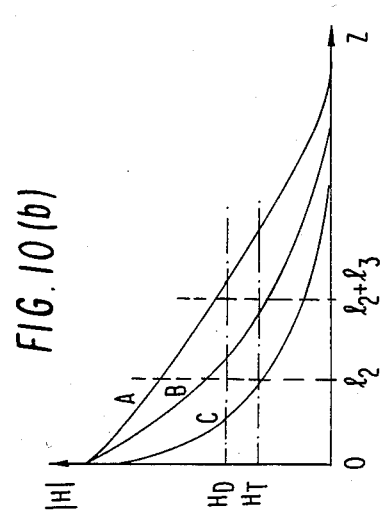

Assuming that thicknesses of the first magnetic layer, the non-magnetic intermediate layer and the second magnetic layer are represented by $l_1$, $l_2$ and $l_3$, respectively, as shown in FIG. 10(a), an absolute value $|H|$ of the magnetic field from the first magnetic layer is decreased as a distance Z elongates from an interface between the first magnetic layer and the intermediate layer, or the second magnetic layer in the case of non of the intermediate layer as shown in FIG. 10(b).

Assuming that an external magnetic field required for the thermal residual magnetization is indicated by $H_T$ and a magnetic field required for the developing is indicated by $H_D$, in the case of a magnetic field denoted by a damping curve A in FIG. 10(b), the magnetic field is sufficient to magnetize the second magnetic layer in a range from $Z = l_2$ to $Z = l_2 + l_3$ but it is so sufficient in a range of $Z > l_2 + l_3$ that a leaky magnetic field can be caused to undesirably attract the image visualizing particles at random. In the case of a magnetic field denoted by a damping curve C, the magnetic field is not sufficient to magnetize the second magnetic layer. As a result, it is necessary to select an operational condition such as a damping curve B, that is, the magnetic field represented by the curve B is sufficient to magnetize the second magnetic layer in a range from $Z = l_2$ to $Z = l_2 + l_3$ and in a range of $Z > l_2 + l_3$ is less than the magnetic field $H_D$ required for the developing operation in the developing region.

The operational condition above described can be relatively selected by the thickness of the first magnetic layer, the magnetic pattern formed over the first magnetic layer, the thickness of the intermediate layer and the thickness of the second magnetic layer.

According to the investigations made by the present inventors, it has been found that though this operational condition can be broadly selected, the most preferable one can be selected.

The magnetic pattern of the first magnetic layer is held as one structure in a portion of the second magnetic layer to which thermal pattern is applied.

Assuming that a magnetic latent image formed in the second magnetic layer is a dot having size of $100\ \mu m \times 100\ \mu m$, a magnetic modulation in correspondence with the magnetic pattern formed in the first magnetic layer exists in this dot.

This magnetic modulation may be a repetitive pattern having a repetitive constant unit in at least one direction on the surface of the first magnetic layer, as shown in FIG. 11(a) or FIG. 11(b). FIG. 11(a) shows an example in which a magnetic pattern is repeated in one direction and FIG. 11(b) shows another example in which a magnetic pattern is mutually repeated in the opposite directions.

Such a magnetic modulation as above described in the heated region of the second magnetic layer is preferable for the developing. If the entire heated region is occupied by one-directional magnetizations, the image visualizing particles undesirably stick only to the boundary of the heated region.

It has been found that a spatial frequency of the magnetic modulation described above largely contributes the image density when developing. Accordingly, the spatial frequency of the magnetic pattern formed over the first magnetic layer should be maintained constant to maintain the reproduced image density at every place of the imaging region constant.

The most suitable size of a repetitive unit (reverse number of the spatial frequency) of the magnetic pattern to be formed may be preferably selected according to an average of the grain size of the image visualizing particles. In addition, it has been found that the repetitive unit may be affected by a damping ratio of the magnetic field in FIG. 10(b) as its distance. If the repetitive unit of the magnetic pattern is small and close, a distance damping ratio of the magnetic field becomes large. In order to select a magnitude of the magnetic pattern to be formed to be constant, a repetitive unit must be elongated in order of the curves A, B and C in FIG. 10(b).

Accordingly, the first magnetic layer should be selected so as to meet the repetitive uniform magnetic pattern formed in advance formed with the image density and the damping ratio of the magnetic field. Further, the damping ratio of the magnetic field may vary in accordance with the thickness of the first magnetic layer.

Assuming that an average of the grain size of the image visualizing particles, a thickness of the first magnetic layer and a repetitive unit of the magnetic pattern are represented by d, $l_1$ and $\lambda$, respectively, according to the investigations made by the present inventors, the preferable ranges of these parameters have been found as follows.

That is, the thickness $l_1$ should be selected so as to satisfy $d/100\ \mu m < l_1 < 10d\ \mu m$. Specifically, the thickness $l_1$ should be ranged from $0.1\ \mu m < l_1 < 100\ \mu m$ when $1\ \mu m < d < 100\ \mu m$. The repetitive unit $\lambda$ should be selected so as to satisfy $d/10\ \mu m < \lambda < 20d\ \mu m$. Specifically, the repetitive unit $\lambda$ should be ranged from 1 $\mu m$ to 200 $\mu m$ when $1\ \mu m < d < 100\ \mu m$.

In the above case, the magnetic pattern of the first magnetic layer is repeated at unit $\lambda$ in the horizontal direction in FIG. 11(a). Of course, if the repetitive unit $\lambda$ is defined as a magnetizing width in the vertical direction, the above described equations may be applied.

As a material of the first magnetic layer, any magnetizable material such as ferromagnetic materials is applicable. The most preferable material is so selected as to have the Curie temperature more than 200° C. and a heat-stabilization. For instance, it is preferable to use a so-called metal tape in which fine particles such as iron (Fe) is dispersed in the macromolecular resin, an iron oxide tape in which $\gamma$-$Fe_2O_3$ grains are dispersed in the macromolecular resin or a magnetic thin film of Co-Ni-P alloy formed by plating.

The magnetic recording medium further may comprise an non-magnetic intermediate layer as mentioned above between the first and second magnetic layers. The preferable intermediate layer is so selected as to have a thickness ranging from 1 $\mu m$ to 100 $\mu m$. The most preferable range is from 5 $\mu m$ to 50 $\mu m$.

Such materials to be used as the intermediate layer are macromolecular resin film made of polyimide or polyarylate, or mylar.

Hereinafter, a method of erasing or demagnetizing the magnetic latent image in the thermo-magnetic recording according to the invention will now be described with reference to the accompanying drawings.

Figure 3:
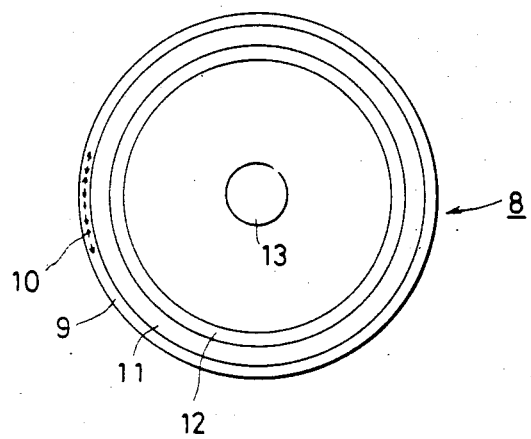
FIG. 3 is an explanatory diagram showing the construction of a demagnetizing heating roll.

FIG. 3 illustrates a demagnetizing heating roll 8 employed in the invention. The heating roll 8 is formed of a ferromagnetic layer 9 having an in-plane magnetization pattern 10 which is uniform over the surface of the roll; a heat resistant elastic layer 11 having a suitable thermal capacity; a core made of a material such as aluminum which is excellent in thermal conductivity; and a heat radiation source 13 made up of a quartz lamp.

Figure 4:
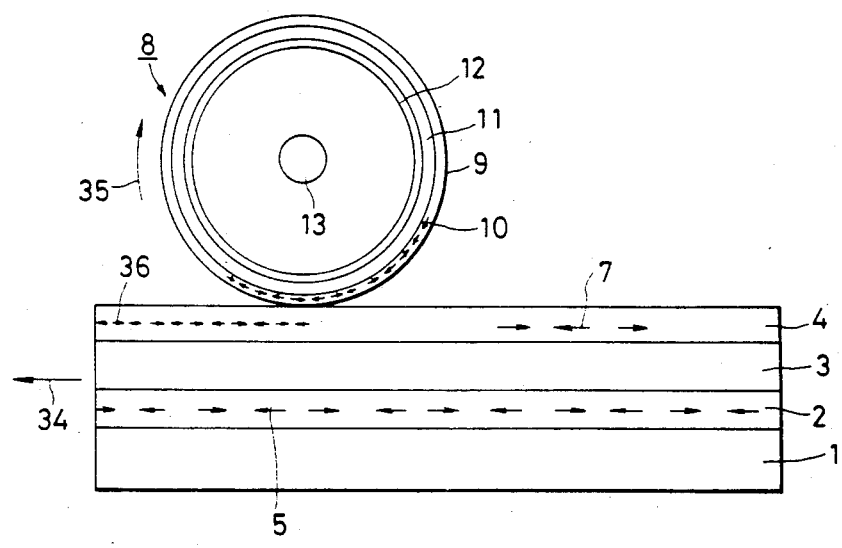
FIG. 4 is an explanatory diagram for describing a demagnetizing operation.

The operation of the demagnetizing heating roll will be described with reference to FIG. 4.

The thermo-magnetic recording medium as shown in FIG. 1 is moved in the direction of the arrow 34, and the demagnetizing heating roll 8 is turned in the direction of the arrow 35 at the same speed as the second magnetic layer 4 while being in close contact with the latter.

As the heating roll 8 is heated by the heat source 13, the temperature of the second magnetic layer 4, which is made of a thermo-magnetic material, is increased to a value at which a thermo-magnetic recording operation can be carried out.

The magnetization which remains in the second magnetic layer after the latter has been heated and magnetized by the heating roll as follows: Both that portion where a magnetic latent image 7 has been formed and that portion where no magnetic latent image was formed are subjected to thermal magnetization in correspondence to the composite magnetic field of the magnetic flux from the erasing magnetization pattern provided by the erasing heating roll and that from the first magnetic layer.

According to investigations made by the present inventors, it has been found that, if the spatial modulation wavelength of the erasing magnetization pattern is selected to be smaller than the wavelength of the magnetization pattern formed in the first magnetic layer, no image visualizing particles stick due to the magnetization which remains after the heating operation using the demagnetizing heating roll.

This phenomenon will be described with reference to FIGS. 5(a)-5(c).

Figure 5A:
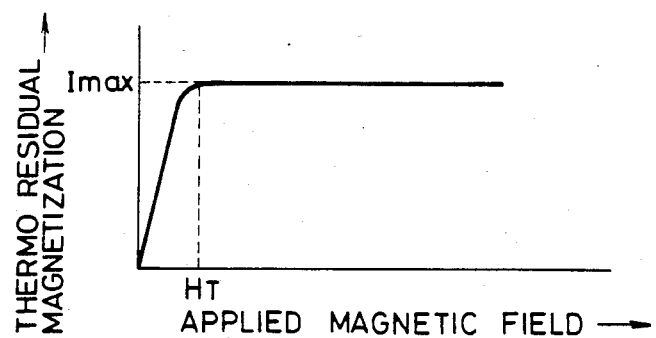
FIGS. 5(a), 5(b), 5(c), 5(d), 5(e) are diagrams for describing the principles of demagnetization.
Figure 5B:
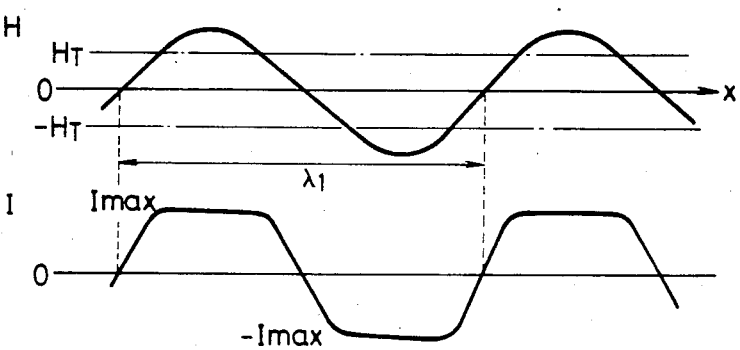
Figure 5C:
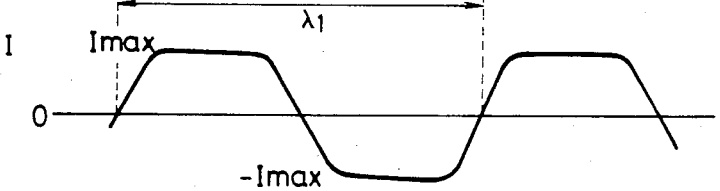

FIG. 5(a) indicates the relation between thermal residual magnetization and applied magnetic field. When the applied magnetic field is smaller than the threshold magnetic field $H_T$, the residual magnetication depends on the applied magnetic field; however, when applied magnetic field exceeds the threshold magnetic field $H_T$, the residual magnetization is substantially a constant value $I_{max}$. The value $H_T$ is a function of the heating temperature of the thermo-magnetic material. For instance, in the case of a commercially available chromium dioxide tape, when the heating temperature is set to higher than 130° C., $H_T$ is about 30 Oe, and the maximum thermal residual magnetization is $Ir \simeq 100$ G ($4\pi Ir \simeq 1200$ G).

Thermal magnetization in the formation of a magnetic latent image will now be described with reference to FIGS. 5(b) and 5(c). When the magnetization pattern formed over the entire first magnetic layer 1 has a spatial wavelength $\lambda_1$, the magnetic field acting on the second magnetic layer is as shown in FIG. 5(b). Accordingly, the portions of the second magnetic layer which are heated, have a thermal residual magnetization as indicated in FIG. 5(c). By this magnetization, a magnetic field is produced on the free space side, thus causing the image visualizing particles to stick thereto.

Figure 5D:
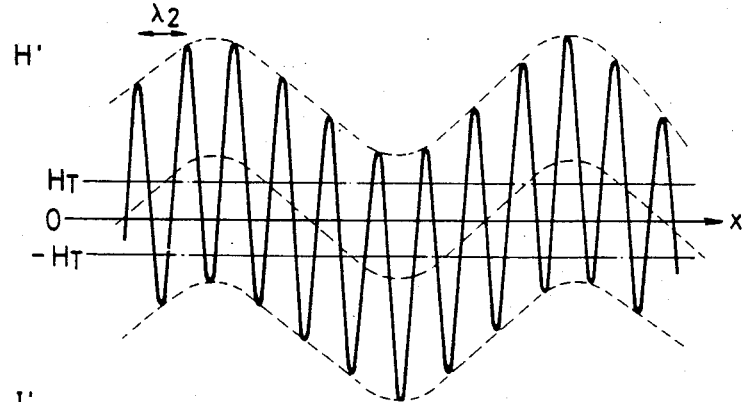

Now, let us consider thermal magnetization when a magnetic field having a spatial wavelength $\lambda_2$ smaller than the spatial wavelength $\lambda_1$ is applied (in an erasing operation). The composite magnetic field of the magnetic fields of the wavelengths $\lambda_1$ and $\lambda_2$, as shown in FIG. 5(d), acts on the second magnetic layer. It can be considered that the thermal residual magnetization with the composite magnetic field as shown in FIG. 5(d) is as indicated in FIG. 5(e).

Figure 5E:
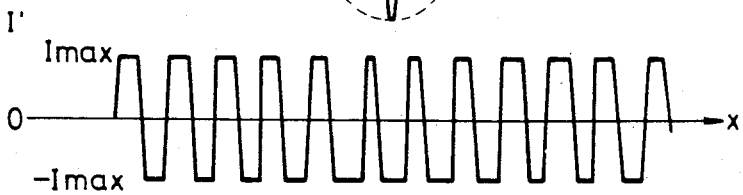

Let us consider the thermal residual magnetization in FIG. 5(e). It is possible to produce a magnetic field on the free space side; however, as the magnetization in the opposite direction exists closely in such a manner that it is adjacent thereto, the magnetic flux returns to the magnetic layer side before going away on the free space side. Accordingly, it can be considered that the magnetization of FIG. 5(e) cannot cause the image visualizing particles to stick.

As is apparent from the above description, in association with the erasing of the magnetization pattern, the demagnetizing heating roll operates to add the magnetic field from the first magnetic layer to a magnetic field having a smaller spatial wavelength, and to subject, under this condition, the second magnetic layer to thermal magnetization to the extent that magnetic adhesion of the image visualizing particles is not caused, thus achieving the erasing operation.

Accordingly, the demagnetizing heating roll may have a construction other than that shown in FIG. 3. That is, the heating roll may have any construction with which the temperature of the thermo-magnetic material is increased a value at which the latter is subjected to thermal magnetization on its entirety, and wherein an erasing magnetic field, the wavelength of which is smaller than the modulation spatial wavelength (of the magnetization pattern formed over the first magnetic field) for the formation of a latent image is applied to the thermo-magnetic material.

Figure 6A:
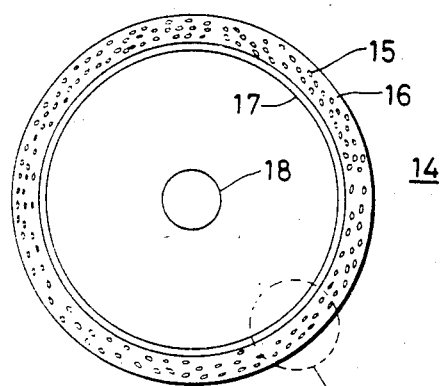
FIGS. 6(a) and 6(b) are diagrams showing one modification of the demagnetizing heating roll.
Figure 6B:
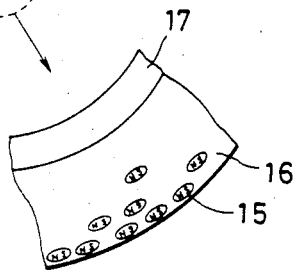

FIGS. 6(a) and 6(b) show one modification of the demagnetizing heating roll, which includes a heat source 18, a core 17, and a polymer layer 16 in which small permanent magnet elements, namely, ferromagnetic particles 15, are dispersed. FIG. 6(b) is an enlarged view of a part of the heating roll of FIG. 6(a).

Figure 7:
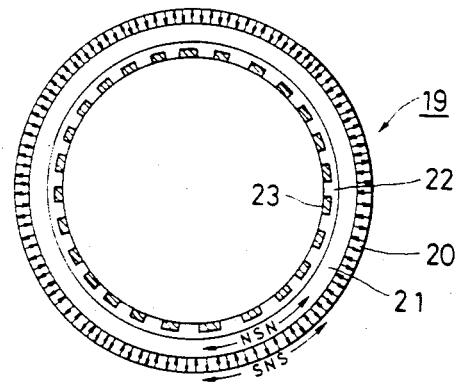
FIG. 7 is a diagram showing another modification of the demagnetizing heating roll.

FIG. 7 shows another modification of the demagnetizing heating roll, which includes a ferromagnetic layer 20 perpendicular magnetized pattern; a core 21; an insulating layer 22; and resistance heating elements 23.

The magnetic element for producing the erasing magnetic field in these modifications may be made of any magnetic material if the magnetic characteristic of the latter is maintained unchanged near the thermo-magnetic operation temperature (such as the Curie temperature) of the second magnetic layer of the magnetic recording element of FIG. 1.

Only roll-shaped demagnetizing devices have been described; however, a demagnetizing device whose configuration is different from the above-described may be used if it can uniformly heat the thermo-magnetic recording medium and can apply an erasing magnetic field of small spatial wavelength thereto.

The erasing magnetic field will now be described in more detail. As was described with reference to FIGS. 5(a)–5(c), the erasing magnetic field is used to assist in the thermal magnetization of the second magnetic layer, which is a thermo-magnetic recording element, to a degree more dense than the first magnetic layer. It is desirable that the magnetic field be provided near the surface of demagnetizing heating roll and be produced from a dense magnetization pattern which is moved together with the heating roll. The spatial modulation wavelength $\lambda_2$ of the magnetization pattern should be smaller than the wavelength $\lambda_1$ of the magnetization pattern which is formed in the first magnetic layer of the magnetic recording medium in FIG. 1. The most preferable relation between these wavelengths is:

$$\lambda_2 = \lambda_1/3$$

The value is suitably selected according to the size of the image visualizing particles (having an average grain size d) and the thickness of the layers of the magnetic recording medium. It is most preferable that $1\ \mu m < \lambda_1 < 200\ \mu m$ when $1\ \mu m < d < 100\ \mu m$. According to the various conditions, the erasing magnetization pattern is so selected as to meet $\lambda_2 = \lambda_1/3$.

The magnetization of the erasing magnetization pattern may be set to an optional value if the maximum value of the magnetic field acting on the second magnetic layer exceeds the magnetic field having the wavelength $\lambda_1$ from the first magnetic layer, under the erasing thermal magnetization operating conditions.

The invention will now be described further with reference to the following example.

EXAMPLE

Figure 8:
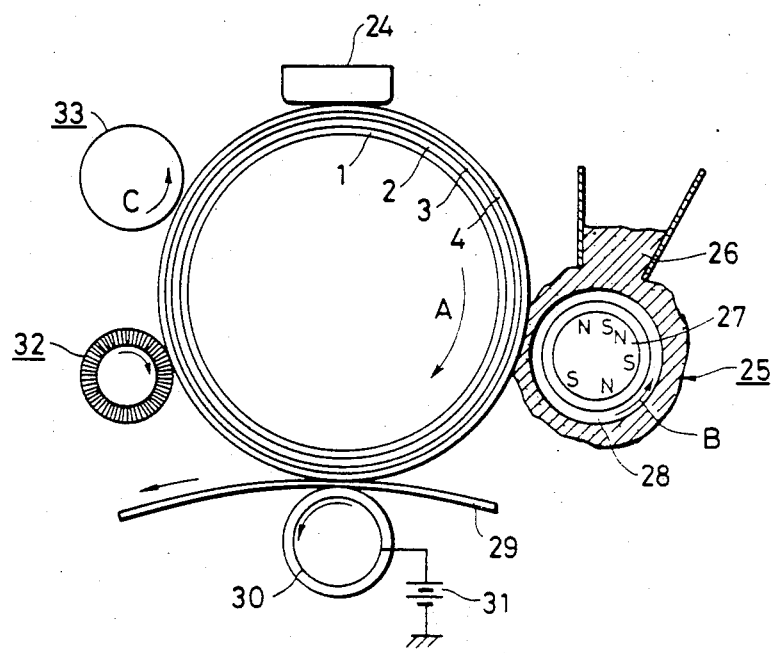
FIG. 8 is a diagram outlining the arrangement of one example of a magnetic recording apparatus with a demagnetizing heating roll which practices the magnetic latent image erasing method according to the invention.

FIG. 8 shows one example of a magnetic recording apparatus including a magnetic latent image carrier and a demagnetizing device. The magnetic recording medium includes a base layer (or an aluminum drum) 1; a first magnetic layer 2 which is a commercially available metal magnetic tape and which has a magnetization pattern formed over its entire surface by performing sinusoidal magnetization with a wavelength of $50\mu$ substantially to saturation; a non-magnetic intermediate layer 3 of polyimide having a thickness of 10 $\mu m$; and a second magnetic layer 4 having a thickness of 10 $\mu m$ which is not intially magnetized, the second magnetic layer 4 being prepared by dispersing chromium oxide in resin. A thermal head array 24 applies a thermal pattern corresponding to an image signal to the magnetic recording medium, which is turned.

A magnetic latent image corresponding to the thermal pattern thus applied is formed in the second magnetic layer 4, and is then brought to a developing unit 25 as the magnetic recording medium is turned. The developing unit 25 operates to supply developing particles to the magnetic latent image so that the particles adhere to the magnetic latent image. The particles are prepared by dispersing magnetic particles such as iron oxide particles in a binder resin. In the case of FIG. 8, the developing unit is a so-called magnetic brush developing unit in which a permanent magnet 27 having suitable magnetic poles is inserted into an outer cylinder 28 which is turned in the direction of the arrow B to convey the developing particles.

The pattern made visual is brought into contact with a transferring member 29 such as a sheet, and is transferred electrostatically onto the member 29 by an electrode roll 39 to which an electrostatic bias means 31 of 300 V is connected.

The developing particles which remain without being transferred to the transferring member are cleaned by a suitable cleaning member such as a bruch roll 32.

In succession, the magnetic latent image is erased by a demagnetizing heating roll 33.

In this example, the demagnetizing heating roll was that shown in FIG. 3. That is, a magnetic layer 9 prepared by dispersing $\gamma\text{-Fe}_2\text{O}_3$ magnetic particles in thermally stable polymer (polyarylate) was coated on a polyimide film (not shown), which was bonded to the silicon resin layer 11 with silicon primer. The core 12 was made of aluminum. A quartz lamp 13 was arranged at the center of the roll. The magnetic layer 9 was uniform in the longitudinal direction of the roll (in the direction perpendicular to the surface of the drawing). A sinusoidal magnetization having a wavelength of 10 $\mu m$ was provided in the direction C of rotation of the roll.

When the surface temperature of the demagnetizing heating roll 3 was set to about 180° C. and was then brought into contact with the magnetic recording medium in the form of the drum, the portion of the drum which was processed (erased) by the demagnetizing heating roll appeared as if not developed; that is, the latent image was satisfactorily erased.

Latent images could be repeatedly formed on portions of the drum, which were processed (erased) by the heating roll, with the thermal head array.

What is claimed is:

1. A magnetic recording medium comprising: a first magnetic layer having an uniform magnetization pattern therein, a non-magnetic intermediate layer, a second magnetic layer which can be thermally magnetized, and a base layer on which said three layers are formed in the stated order.

2. A magnetic recording method using a magnetic recording medium including a first magnetic layer having a uniform periodic magnetization pattern therein, said period magnetization pattern comprising a repetitive pattern having a repetitive unit ranging from 1 to 200 microns in at least one direction in the entire surface of said first magnetic layer, a second magnetic layer capable of being thermally magnetized, and a base layer on which the three layers are formed in the stated order, characterized by forming a magnetic latent image on said second magnetic layer by heating said second magnetic layer in the image shape.

3. A magnetic recording medium, comprising:
a first magnetic layer in which a uniform periodic magnetization pattern is formed, said periodic magnetization pattern comprising a repetitive pattern having a repetitive unit ranging from 1 to 200 microns in at least one direction in the entire surface of said first magnetic layer;
a second magnetic layer which can be thermally magnetized; and
a base layer on which said two layers are formed in the stated order.

4. A magnetic recording medium as claimed in claim 1, wherein said magnetization pattern comprises a periodic magnetic pattern.

5. A magnetic recording medium as claimed in claim 4, wherein said periodic magnetization pattern comprises a repetitive pattern having a repetitive unit ranging from 1 to 200 $\mu$m in at least one direction in the entire surface of said first magnetic layer.

* * * * *